United States Patent [19]
Clark et al.

[11] 3,856,779
[45] Dec. 24, 1974

[54] PROCESS FOR THE PREPARATION OF SODIUM SALT OF AMPICILLIN

[76] Inventors: Dennis Edward Clark, 239D Blossom Dr., R.D. No. 1, Basking Ridge, N.J. 07920; Robert Christopher Hutton, 17 Withdean Ave., Goring, England

[22] Filed: Feb. 23, 1973

[21] Appl. No.: 335,359

Related U.S. Application Data

[63] Continuation of Ser. No. 145,512, May 20, 1971.

[30] Foreign Application Priority Data
Mar. 3, 1966  Great Britain ..................... 9260/66

[52] U.S. Cl. ............................. 260/239.1, 424/271
[51] Int. Cl. ........................................... C07d 99/16
[58] Field of Search ................................. 260/239.1

[56]  References Cited
UNITED STATES PATENTS

| | | | |
|---|---|---|---|
| 2,684,363 | 7/1954 | Wachtel et al. | 260/239.1 |
| 2,985,648 | 5/1961 | Doyle et al. | 260/239.1 |
| 3,262,928 | 7/1966 | Granatek | 260/239.1 |

FOREIGN PATENTS OR APPLICATIONS

| | | | |
|---|---|---|---|
| 980,240 | 1/1965 | Great Britain | 260/239.1 |

*Primary Examiner*—Nicholas S. Rizzo

[57]  ABSTRACT

The sodium salt of ampicillin is prepared by forming a solution of the diethylamine salt of the ampicillin in methylene dichloride with only a small excess of diethylamine over the stoichiometric requirement and recovering the sodium salt precipitated upon the addition of a sodium or sodio precipitant.

5 Claims, No Drawings

PROCESS FOR THE PREPARATION OF SODIUM SALT OF AMPICILLIN

This is a continuation of application Ser. No. 145,512, filed May 20, 1971.

This invention relates to penicillins and is particularly concerned with α-aminobenzylpenicillin and its alkali metal salts.

α-Aminobenzylpenicillin and its epimers, 6-[D(-)-α-aminophenylacetamido]penicillanic acid and 6-[L(+)α-aminophenylacetamido]penicillanic acid, and their salts are described and claimed in our U.S. Pat. Nos. 2,986,648. These penicillins have valuable antibiotic activity and are useful as therapeutic agents in animals, including man, in the treatment especially of infectious diseases caused by Gram-positive and Gram-negative bacteria.

α-Aminobenzylpenicillins are normally encountered in the form of the free acid, or to be more precise, the Zwitterions. These forms, although suitable for oral administration, are too sparingly soluble in water for convenient use as injectable preparations and, accordingly, injectable α-aminobenzylpenicillins are provided in the form of the alkali metal salts, which are freely soluble in water.

It is an object of the present invention to provide a novel process for preparing the alkali metal salts of α-aminobenzylpenicillins, which process results in enhanced yields and purity of these salts over the conventional processes, e.g., spray drying.

Accordingly, the present invention provides a process for the preparation of the alkali metal salts of α-aminobenzylpenicillin, and its epimers, which process comprises treating the penicillin in an organic solvent with a primary or secondary aliphatic amine, a cycloaliphatic amine or a heterocyclic amine to form a solution of the corresponding amine salt and thereafter precipitating the alkali metal salt therefrom.

Preferably the amine is ehtylamine, diethylamine, cyclohexylamine, piperidine, N-ethylpiperdine or N-methylpyrrolidine.

In a preferred form of the present invention the diethylamine salt of α-aminobenzylpenicillin is employed, which salt is soluble in various solvents, such as methylene dichloride, chloroform, nitroethane, acetonitrile and tetrachloroethane, in which the alkali metal salts are insoluble. Thus α-aminobenzylpenicillin can be dissolved in methylene dichloride by adding a moderate excess of diethylamine and the sodium salt recovered therefrom by the addition of a precipitant.

Examples of suitable precipitants include sodium methoxide, sodium iodide, sodium phenoxide, sodium thiocyanate and ethyl sodio-acetoacetate.

The α-aminobenzylpenicillin used in the process may be in any convenient form; when the trihydrate is used, a dehydrating agent such as anhydrous sodium or calcium sulphate is added to the initial mixture with the amine in the organic solvent, and is removed before precipitation of the alkali metal salt.

The following Examples illustrate the invention; in these Examples the term "ampicillin" has been used for the α-aminobenzylpenicillin employed:

EXAMPLE 1

Ampicillin (50 g. active weight) was finely ground and slurried in methylene dichloride (500 ml.). Diethylamine (17 ml; 12% excess) was then added dropwise over 15 minutes, and the resulting mixture stirred for a further 45 minutes. The solution was filtered, and a solution of sodium iodide (21.4 g.) in isopropanol (110 ml.) was added with stirring over a 15 minute period. The solution was stirred to incipient precipitation and allowed to stand for two hours at room temperature. The sodium salt of ampicillin was filtered off, and dried to constant weight in a vacuum oven at 40°C.

In alternative procedures (a) sodium methoxide (7.8 g. in 100 ml. isopropanol and 50 ml. methylene dichloride), (b) sodium phenoxide (16.5 g. in 100 ml. isopropanol), and (c) ethyl sodio-acetoacetate (1 equivalent per mole of ampicillin, in isopropanol), were employed in place of the sodium iodide solution.

EXAMPLE 2

Ampicillin (20 g. activity weight) was suspended in methylene dichloride (200 ml.) and piperidine (4.8 g.) was added over 15 minutes. The resulting slurry was stirred for a further 30 minutes and a solution of sodium iodide (8.6 g.) in isopropyl alcohol (45 ml.) was added over 1 minute. A clear solution occurred for a period of about 30 seconds before the sodium salt of ampicillin began to precipitate. After 2 hours the product was harvested and dried to constant weight in a vacuum oven at 40°C.

EXAMPLE 3

Ampicillin (20 g.) was slurried in methylene dichloride (200 ml.) and cyclohexylamine (5.8 ml.) added over 15 minutes. Methanol (16 ml.) was added slowly (e.g. during 15 minutes), the resulting solution was filtered and slowly treated (15 minutes) with sodium iodide (8.6 g.) dissolved in isopropanol (40 ml.). Stirring was continued to incipient crystallisation only, and after a further 2 hours at ambient temperature the sodium salt of ampicillin was collected, and dried to constant weight in a vacuum oven at 40°C.

EXAMPLE 4

Ampicillin (50 g. activity weight) was slurried in methylene dichloride (500 ml.) and N-ethylpiperidine (85 ml.) was added over 15 minutes. Stirring was continued at ambient temperature until complete dissolution occurred, and the filtered solution was treated over a 15 minute period with sodium iodide (21.4 g.) dissolved in isopropanol (110 ml.). The sodium salt of ampicillin was harvested and dried as cited in previous examples.

In an alternative procedure sodium methoxide (7.8 g. in 100 ml. isopropanol and 50 ml. methylene dichloride) was used in place of the sodium iodide solution.

EXAMPLE 5

By substituting N-methylpyrrolidine (30 g.) for N-ethylpiperidine in the preceding example, and adding a solution of sodium iodide (21.4 g.) in isopropanol (110 ml.) the sodium salt of ampicillin was precipitated and isolated in the same manner.

EXAMPLE 6

The following base and precipitant combinations were used to produce the sodium salt of ampicillin in accordance with the procedures set forth in the preceding Examples.

| Base | Precipitant |
|---|---|
| Diethylamine | Sodium thiocyanate |
| Ethylamine | Sodium iodide |
| Ethylamine | Sodium thiocyanate |
| Cyclohexylamine | Sodium methoxide |
| Cyclohexylamine | Sodium thiocyanate |

EXAMPLE 7

Ampicillin trihydrate, purity 85.3% (59 g.), and anhydrous sodium sulphate (50 g.) were suspended in methylene dichloride (500 ml.). To the mixture was added, with good stirring, diethylamine (22.1 ml.) during 30 minutes. After being stirred for an additional period of 30 minutes the mixture was filtered. To the solution was added anhydrous calcium sulphate (50 g.) and the suspension was stirred for about 45 minutes and again filtered. A filtered solution of sodium methoxide (9.0 g.) in isopropyl alcohol (200 ml.) and methylene dichloride (200 ml.) was added to the stirred solution during a period of 40 minutes at a temperature of 26°C. Crystallisation started spontaneously and the stirring was continued for 3 hours. The product was filtered off, washed with methylene chloride (60 + 40 ml.) and dried at 40°C for about 14 hours to give sodium ampicillin.

EXAMPLE 8

Diethylamine (51 ml.) was added slowly at ambient crystals. to an agitated slurry of finely divided anhydrous ampicillin (150 g., activity weight) in dry methylene dichloride (160 ml.). After dissolution, the solution was filtered via a bacteriological filter into a clean, dry, sterile receiver. Simultaneously, sodium methoxide (22.4 g.) was dissolved in an agitated mixture of methylene dichloride (350 ml.) and isopropyl alcohol (350 ml.) in a clean and dry vessel; residual turbidity was removed by sterile filtration, and the filtrate was added slowly (ca 30 minutes) to the stirred solution in the presence of seed cyrstalls. After about 3 hours, the product was collected under moisture-free conditions and washed with methylene dichloride. It was then transferred to a forced-air oven as quickly as possible to dry at 40° C for about 6 hours until the moisture content was less than 1.5%.

What is claimed is:

1. A process for the preparation of the sodium salt of the D-(-)-epimer of $\alpha$-aminobenzylpenicillin which comprises forming a solution of the diethylamine salt of the said penicillin in methylene dichloride with only a small excess of diethylamine over the stoichiometric requirement and recovering the sodium salt of the said penicillin precipitated therefrom upon the addition of a sodium or sodio precipitant.

2. A process according to claim 1 in which the precipitant is selected from the group consisting of sodium methoxide, sodium iodide, sodium phenoxide, sodium thiocyanate and ethyl sodio-acetoacetate.

3. A process according to claim 1 in which the starting penicillin is ampicillin trihydrate, anhydrous sodium or calcium sulphate or both is added prior to the addition of the sodium or sodio precipitant and is removed before precipitation of the sodium salt.

4. A process according to claim 1 in which the starting penicillin is slurried in methylene dichloride and the sodium precipitant is a solution of sodium iodide in isopropanol.

5. A process for the preparation of the water-soluble sodium salt of ampicillin in enhanced yield and purity suitable for injection which comprises suspending ampicillin trihydrate and anhydrous sodium sulphate in methylene dichloride, adding diethylamine in only small excess over the stoichiometric requirement to minimize degradation of the ampicillin with stirring to form a solution of the diethylamine salt of ampicillin, adding anhydrous calcium sulphate to the solution, adding sodium methoxide in isopropyl alcohol and methylene dichloride whereupon sodium ampicillin crystallizes out and recovering dried sodium ampicillin.

* * * * *

UNITED STATES PATENT OFFICE
CERTIFICATE OF CORRECTION

PATENT NO. : 3,856,779
DATED : December 24, 1974
INVENTOR(S) : Dennis E. Clark

It is certified that error appears in the above-identified patent and that said Letters Patent are hereby corrected as shown below:

In the heading after the names and addresses of the inventors, insert:

--assignors to Beecham Group Limited, a British company--

After the abstract, the patent should read with the following insert:

--The present application is a continuation of application Serial No. 145,512 filed May 20, 1971 which in turn is a continuation of application Serial No. 9,108 filed February 9, 1970 which in turn is a continuation of application Serial No. 619,572 filed March 1, 1967.--

Signed and Sealed this nineteenth Day of July 1977

[SEAL]

Attest:

RUTH C. MASON
Attesting Officer

C. MARSHALL DANN
Commissioner of Patents and Trademarks